United States Patent
Beyer et al.

(10) Patent No.: US 7,617,288 B2
(45) Date of Patent: Nov. 10, 2009

(54) METHOD FOR TRANSMITTING DATA IN THE ACCESS AREA

(75) Inventors: Guenter Beyer, Germering (DE); Reiner Gieck, Germering (DE)

(73) Assignee: Nokia Siemens Networks GmbH & Co. KG, Munich (DE)

( * ) Notice: Subject to any disclaimer, the term of this patent is extended or adjusted under 35 U.S.C. 154(b) by 694 days.

(21) Appl. No.: 10/333,321

(22) PCT Filed: Jul. 11, 2001

(86) PCT No.: PCT/DE01/02584

§ 371 (c)(1), (2), (4) Date: Jan. 17, 2003

(87) PCT Pub. No.: WO02/09341

PCT Pub. Date: Jan. 31, 2002

(65) Prior Publication Data

US 2004/0078477 A1    Apr. 22, 2004

(30) Foreign Application Priority Data

Jul. 20, 2000    (DE) ................................ 100 35 389

(51) Int. Cl.
*G06F 15/16* (2006.01)
*G01R 31/08* (2006.01)
(52) U.S. Cl. ..................... 709/208; 370/231
(58) Field of Classification Search ......... 709/201–253; 375/219–225; 370/543–545, 914, 229–240, 370/465, 468
See application file for complete search history.

(56) References Cited

U.S. PATENT DOCUMENTS

| | | | | |
|---|---|---|---|---|
| 4,608,689 A | * | 8/1986 | Sato | 709/228 |
| 4,780,883 A | * | 10/1988 | O'Connor et al. | 375/219 |
| 5,537,398 A | * | 7/1996 | Siwiak | 370/204 |
| 5,627,970 A | * | 5/1997 | Keshav | 709/233 |
| 5,938,731 A | * | 8/1999 | Schreiter | 709/227 |
| 5,943,364 A | * | 8/1999 | Yoshida | 375/222 |
| 6,038,216 A | * | 3/2000 | Packer | 370/231 |
| 6,044,396 A | * | 3/2000 | Adams | 725/95 |
| 6,219,713 B1 | * | 4/2001 | Ruutu et al. | 709/235 |
| 6,252,851 B1 | * | 6/2001 | Siu et al. | 370/236 |
| 6,282,572 B1 | * | 8/2001 | Dahlin et al. | 709/228 |

(Continued)

FOREIGN PATENT DOCUMENTS

WO    WO 00/27162    5/2000

OTHER PUBLICATIONS

W. Stevens, "RFC 2001—TCP Slow Start, Congestion Avoidance, Fast Retransmit, and Fast Recovery Algorithms", Jan. 1997.*

*Primary Examiner*—J Bret Dennison
(74) *Attorney, Agent, or Firm*—Laurence A. Greenberg; Werner H. Stemer; Ralph E. Locher

(57) ABSTRACT

In state of the art baseband methods, the range in the access area decreases with increasing transmission speed. When a limit is reached with a predetermined distance and a selected speed, it is no longer possible to change over to an even greater speed. Otherwise, the synchronism between the transmitter and receiver is lost. The invention resolves this deficiency by combining the features of broadband technology with an acknowledged message exchange by means of which the parameters can be controlled between the transmitter and the receiver.

8 Claims, 1 Drawing Sheet

U.S. PATENT DOCUMENTS

| | | | |
|---|---|---|---|
| 6,330,462 B1 * | 12/2001 | Chen | 455/572 |
| 6,498,808 B1 * | 12/2002 | Tzannes | 375/225 |
| 6,519,636 B2 * | 2/2003 | Engel et al. | 709/223 |
| 6,603,741 B1 * | 8/2003 | Poulter et al. | 370/252 |
| 6,606,319 B1 * | 8/2003 | Wildmoser et al. | 370/394 |
| 6,667,991 B1 * | 12/2003 | Tzannes | 370/465 |
| 6,745,049 B1 * | 6/2004 | Uchida et al. | 455/560 |
| 6,865,609 B1 * | 3/2005 | Gubbi et al. | 709/230 |
| 6,894,974 B1 * | 5/2005 | Aweva et al. | 370/230.1 |
| 6,914,890 B1 * | 7/2005 | Tobita et al. | 370/338 |
| 6,925,502 B1 * | 8/2005 | Abbasi et al. | 709/232 |
| 6,928,052 B2 * | 8/2005 | Packer | 370/231 |
| 6,996,123 B1 * | 2/2006 | Jiang et al. | 370/465 |
| 7,035,214 B1 * | 4/2006 | Seddigh et al. | 370/231 |
| 7,058,723 B2 * | 6/2006 | Wilson | 709/235 |
| 7,263,067 B2 * | 8/2007 | Sreemanthula et al. | 370/236 |
| 7,352,758 B2 * | 4/2008 | Makam et al. | 370/405 |
| 2002/0080824 A1 * | 6/2002 | Wingrove | 370/509 |
| 2002/0146036 A1 * | 10/2002 | Berger | 370/468 |
| 2005/0041581 A1 * | 2/2005 | Kuusinen et al. | 370/230 |
| 2005/0213535 A1 * | 9/2005 | Uchida et al. | 370/328 |
| 2006/0142042 A1 * | 6/2006 | Uchida et al. | 455/522 |
| 2007/0133705 A1 * | 6/2007 | Tzannes | 375/260 |

* cited by examiner

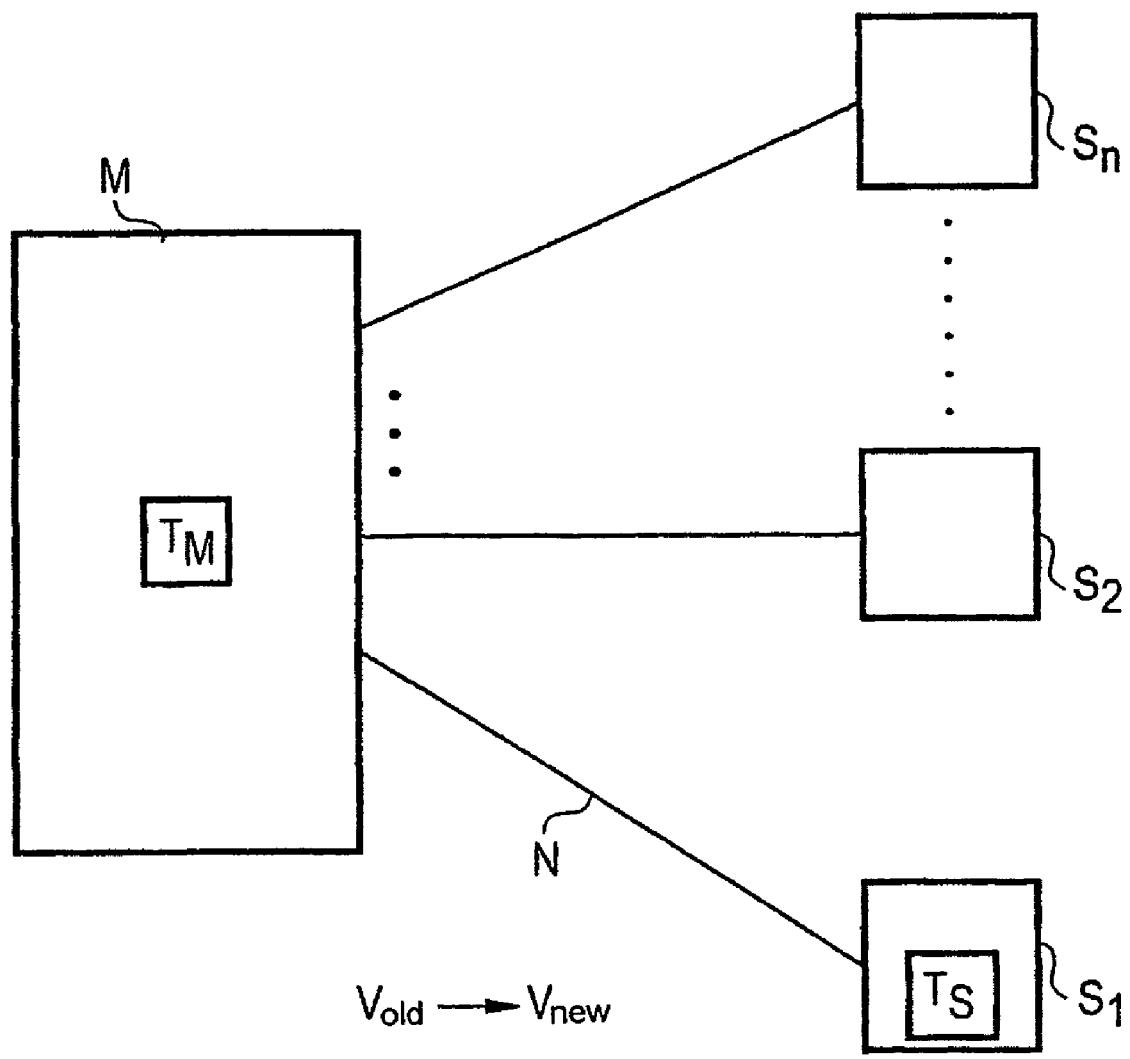

METHOD FOR TRANSMITTING DATA IN THE ACCESS AREA

CLAIM FOR PRIORITY

This application claims priority to International Application No. PCT/DE01/02584 which was published in the German language on Jan. 31, 2002.

TECHNICAL FIELD OF THE INVENTION

The invention relates to a method for transmitting data in an access area.

BACKGROUND OF THE INVENTION

When state of the art baseband methods are used, the range decreases with increasing transmission rate. This means that when the transmission rate is increased, the data to be transmitted can only be supplied to subscribers via trunk lines of decreasing length. If, with a predetermined distance and a selected rate, the limit is already reached, it is no longer possible to switch to an even higher rate. Since the distance to the limit is often unknown, one possibility of solving the problem is to change the rate in small steps. However, this frequently results in performance being given away. As an alternative, in principle, only those ranges can be selected at which it is ensured that they can be bridged even at the maximum possible rate.

If the transmission rate between the transmitting device and the receiving devices is to be increased, this is done such that both stations (i.e. transmitting device and receiving devices) operate at the same increased rate. For this purpose, the receiving device in question in each case must be informed by one of the stations such as, e.g. the transmitting device, that an increase in transmission rate is required and corresponding setting instructions must also be transmitted for this purpose.

The communication between transmitting device and receiving device required for this purpose takes place via a separate channel. This can be designed as an independent outband channel (user data and control data (signaling data) are conducted via different links) or inband channel (user data and control data are conducted via one link). In the latter case, care must be taken, with appropriate reliability of range, that the communication between the two stations is still ensured after switching up to a higher rate. In cases of doubt, therefore, the rate for an existing connection must be maintained.

Increasing the transmission rate above the critical limit presents problems since the level arriving at the receiving site is too low and, consequently, synchronism between the transmitting device and the receiving device is lost ("receiving device disconnecting") and thus communication between the two stations is no longer possible. The reason for this is that in this case, the transmitting device has already adjusted itself to the increased rate but the remote station is still operating at the old rate by itself.

Communication is then no longer possible since the remote station is "disconnected". Interworking is only possible again when both stations are manually set to the same rate.

SUMMARY OF THE INVENTION

The invention relates to a method for transmitting data in an access area.

In the access area, data are supplied to one or more subscribers (receiving devices) from a transmitting device. The transmitting device can be constructed as a multiplexer or, in the case of telephony, as a local exchange. In this arrangement, different transmission methods are applicable.

The invention discloses an approach to how synchronism between transmitting and receiving device can be reliably achieved again even after the transmission rate has been changed.

On advantage of the invention is the use of an acknowledged message exchange between the master device (local station) and the slave devices (remote stations). To this extent, characteristics of broadband technology are combined with an acknowledgement. Hence, the remote stations are not disconnected since otherwise they could no longer be reached. Due to the fact that synchronism is achieved time and again, the blocking probability of the system is reduced.

BRIEF DESCRIPTION OF THE DRAWINGS

In the text which follows, the invention is explained in greater detail with reference to the exemplary embodiments shown in the FIGURE, in which:

FIG. 1 shows a local station and multiple remote stations.

DETAILED DESCRIPTION OF THE INVENTION

FIG. 1 shows a configuration with a local station M and a plurality of remote stations $S_1 \ldots S_n$. The local station M is configured to a master device (transmitting device) and the remote stations $S_1 \ldots S_n$ can act as slave devices (receiving devices). According to the invention, an acknowledged message exchange is carried out between master device M and slave devices $S_1 \ldots S_n$.

In the exemplary embodiment, it is assumed that the transmission of user data between the master device M and the slave devices $S_1 \ldots S_n$, is to be controlled at an increased transmission rate $v_{new}$. This process is initiated by the master device M. Communication between the master and the slave device takes place via an inband channel. To obtain a better understanding, an increase in transmission rate between the master device M and one of the slave devices $S_1 \ldots S_n$, e.g. $S_1$, is described.

Firstly, a message N is transmitted to the slave device $S_1$ via a management channel, by means of which message it is informed that the transmission rate $v_{old}$ previously used is to be increased. The message N is still transmitted at the old transmission rate $v_{old}$ so that the slave device $S_1$ can receive the message N without problems. At the same time, a timer $T_M$ is started in the master device M, on the one hand, and, on the other hand, the corresponding adjustments for increasing the transmission rate $v_{old}$ to the new transmission rate $v_{new}$ are carried out.

The message N is received and evaluated by the slave device $S_1$. In response, the corresponding adjustments for increasing the transmission rate $v_{old}$ are carried out in the slave device $S_1$. This process is acknowledged, already at the new increased transmission rate $v_{new}$, by means of an acknowledgement message via the management channel to the master device M. At the same time, a timer $T_S$ is also started in the slave device $S_1$.

The acknowledgement message is evaluated by the master device M and, depending on the result of the evaluation, a further acknowledgement message is supplied to the slave device $S_1$. Once the slave device $S_1$ has received its message, it can assume that the master device M is also capable of transmitting at the new increased transmission rate $v_{new}$. It is when the slave device $S_1$ has received this acknowledgement message at the new transmission rate $v_{new}$ that the transmission link for transmitting the user data at the new, increased transmission rate $v_{new}$ is released.

If an incorrect action takes place during these processes, the timers $T_M$, $T_s$ ensure, after a predetermined timeout period, that both stations switch back to the old transmission rate $v_{old}$. If necessary, the switchover can then be started again by the master device M.

In the exemplary embodiment, it has been assumed that the increase in transmission rate between master device M and slave device $S_1$ is controlled. The relevant information is deposited in the message N. However, the invention is not restricted to this type of message exchange. Thus, a multiplicity of other parameters can be exchanged. Examples of this are parameters such as clock characteristic, clock variants in master/slave, state characteristics (master/slave), synchronous/asynchronous operation or CRC check. Since the slave devices can become "disconnected" in the prior art, these parameters are often be transmitted in the correct order.

In another embodiment of the invention, the order of the parameters to be changed to the slave device is arbitrarily varied. This is a direct consequence of the invention according to which the timeout period prevents the remote station from becoming "disconnected". It provides the possibility for automatic transmission rate detection and utilization of a maximum possible transmission rate with a predetermined line length.

In the latter case, the process begins at a low transmission rate at which it is ensured that the range can be bridged by the system. The transmission rate is then increased step by step until neither of the two acknowledgement messages can be received any more. The user data are then transmitted at the transmission rate at which the acknowledgement was still successfully carried out last.

In the case of a new installation of a connection, the transmission link can be automatically adjusted optimally with regard to transmission rate and line length. The prerequisite for this in each case is a station previously defined as master device or slave device with the lowest rate as the default setting. When autoconfiguration is activated, the master automatically then begins to change the rate once the synchronization has been established at the lowest rate.

What is claimed is:

1. A method for changing a transmission rate in an access area, including a transmitting device and at least one receiving device which operates in a master/slave configuration, the transmitting device being configured as a master device and the receiving device being configured as a slave device, comprising:
   sending a message with a first transmission rate from the master device to the at least one slave device informing the at least one slave device that the transmission rate is to be changed;
   evaluating the received message in the at least one slave device;
   carrying out adjustments for changing the transmission rate to a second transmission rate in the at least one slave device based on a result of the evaluation;
   acknowledging the adjustments with the aid of a first acknowledgement message transmitted at the second transmission rate;
   acknowledging, via the master device, the reception of the first acknowledgement message to the at least one slave device with the aid of a second acknowledgement message transmitted at the second transmission rate; and
   maintaining the first transmission rate when one of the two acknowledgement messages does not arrive within a predetermined timeout period.

2. The method as claimed in claim 1, wherein the message has information about whether the transmission rate and/or other parameters are to be changed.

3. The method as claimed in claim 1, wherein parameters are clock variants in the master/slave synchronous/asynchronous operating mode or data transmissions with or without CRC error corrections.

4. The method as claimed in claim 1, wherein the first transmission rate is lower than the second transmission rate.

5. The method as claimed in claim 1, wherein the message is transmitted via a management channel.

6. The method as claimed in claim 1, wherein beginning at a low transmission rate, the rate is increased step by step until the first or second acknowledgement message can no longer be received whereupon the user data are transmitted at the transmission rate at which the two acknowledgement messages were still received successfully last.

7. The method of claim 1, further comprising:
   maintaining a connection between the master device and the at least one slave device while changing the transmission rate in the access area.

8. An apparatus for changing the transmission rate in an access area, comprising:
   a transmitting device operating in a master/slave configuration and configured as a master device; and
   at least one receiving device, the at least one receiving device configured as a slave device, wherein
   messages are exchanged between the master device and the at least one slave device informing the at least one slave device that the transmission rate is to be changed,
   the master device sends a message with a first transmission rate to the slave device,
   the at least one slave device evaluates the received message;
   the at least one slave device carries out adjustments for changing the transmission rate to a second transmission rate based on a result of the evaluation and the adjustments are acknowledged with the aid of a first acknowledgement message transmitted at the second transmission rate;
   the master device acknowledges the reception of the first acknowledgement message to the at least one slave device with the aid of a second acknowledgement message transmitted at the second transmission rate, and
   the first transmission rate is maintained when one of the two acknowledgement messages does not arrive within a predetermined timeout period.

* * * * *